United States Patent
Mast

[11] 3,889,543
[45] June 17, 1975

[54] PROPULSION SYSTEM

[76] Inventor: Oscar Mast, 24 Sunshine Dr., Dollard des ormeaux 980, Quebec, Canada

[22] Filed: Apr. 16, 1973

[21] Appl. No.: 351,329

[52] U.S. Cl. .................................. 74/88; 180/54 R
[51] Int. Cl. ............................................. B60k 9/00
[58] Field of Search ............ 60/668; 74/88; 180/54; 185/27, 29, 4

[56] References Cited
UNITED STATES PATENTS

| | | | |
|---|---|---|---|
| 3,555,915 | 1/1971 | Young, Jr. | 74/84 S |
| 3,810,394 | 5/1974 | Novak | 74/84 S |

FOREIGN PATENTS OR APPLICATIONS

| | | | |
|---|---|---|---|
| 1,906,960 | 8/1970 | Germany | 180/7 R |
| 115,928 | 1/1930 | Germany | 74/84 S |
| 704,568 | 3/1965 | Canada | 74/84 S |

Primary Examiner—Martin P. Schwadron
Assistant Examiner—Allen M. Ostrager

[57] ABSTRACT

This invention relates to a vehicle propulsion system which generates a force on the vehicle frame in the direction of travel. The propulsive force is obtained from the interaction between two magnets; wherein one magnet transmitting the propulsive force is fixed to the vehicle frame, and the other is free to reciprocate toward or away from the fixed one depending on presence or absence of magnetic interacting field. The reaction to the propulsive force is almost totally absorbed in accelerating the reciprocating magnet assembly in an opposite direction to the travel direction. That is, up an inclined plane which is integral with the vehicle frame.

4 Claims, 5 Drawing Figures

PATENTED JUN 17 1975     3,889,543
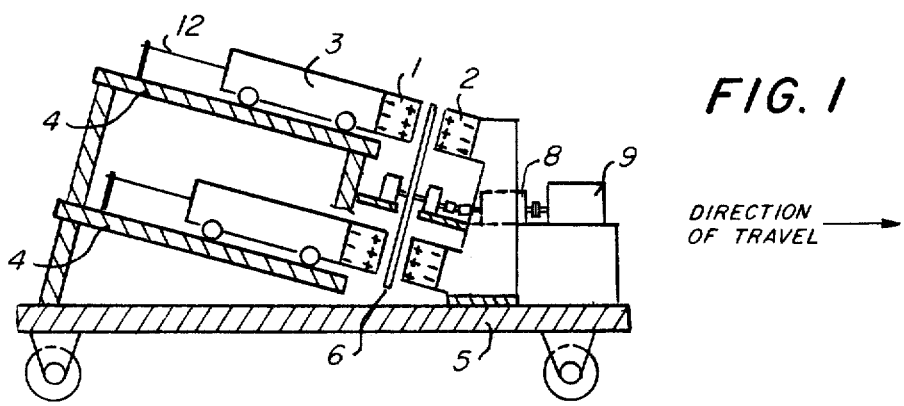
FIG. 1
DIRECTION OF TRAVEL →
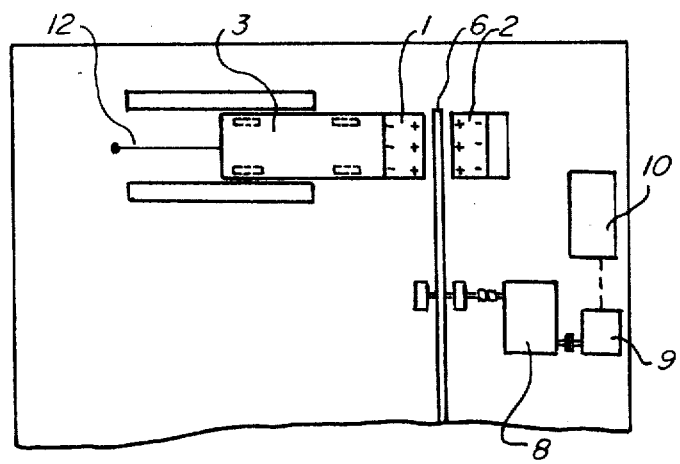
FIG. 2
FIG. 3
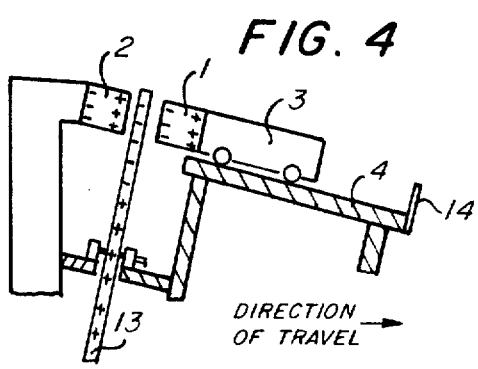
FIG. 4
DIRECTION OF TRAVEL →
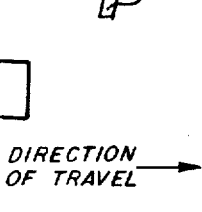
FIG. 5
DIRECTION OF TRAVEL →

PROPULSION SYSTEM

This specifications relates to a battery operated propulsion system for different types of vehicles and crafts.

I have found that it is possible to utilize repulsion or attraction between similar or opposite poles in a pair of magnets to propel a vehicle by generating a force on its frame in the direction of travel. The system takes advantage of gravity forces to exert a propelling force on the vehicle. In addition, some of the power required to operate the system may be regenerated to partially recharge the storage battery.

Drawings which illustrate the embodiments of the invention:

FIG. 1 shows one pair of propulsion system elements utilising repulsive forces between similar poles of two permanent magnets.

FIG. 2 is a partial plan view of FIG. 1.

FIG. 3 shows a rotating disc separating two magnets.

FIG. 4 shows one pair of propulsion system elements utilising attractive forces between opposite poles of two permanent magnets.

FIG. 5 shows one pair of propulsion system elements utilizing repulsive forces between a permanent magnet and an electromagnet.

In FIGS. 1 and 2, a permanent magnet 2 is fixed to the vehicle frame 5 and faces a similar pole of magnet 1, mounted on mass 3, which is free to reciprocate along an inclined plane 4 sloping up from the stationary magnet. The two magnets are separated by a rotating disc 6 spun by an electric motor 9 through a gear drive 8. The motor is driven by a storage battery 10. The movement of magnet 1 toward the stationary magnet 2 is limited by an elastic string 12 attached to the vehicle frame.

FIG. 3 shows the rotating disc 6 consisting of two sectors: 6A— made of non-flux conducting material, such as austenitic stainless steel and sector 6B— made of flux conducting material such as rolled cold steel. A number of magnet pairs are spaced in the area covered by the disc. In each pair the free magnet assembly reciprocates on an inclined plane 4.

In FIG. 4 the permanent magnets in a pair are separated by a disc consisting of a non-flux conducting sector and a sector radially magnetized on its periphery, facing the two magnets, to the same polarity as the free magnet. Outward stroke of the free magnet is limited by the frame mounted stop 14.

In FIG. 5 the electromagnet II is supplied by voltage transforming and timing device 7 fed by a storage battery 10.

Considering the arrangement utilizing repulsion between similar poles of two permanent magnets, (FIG. 1) rotation of the separating disc 6 will alternately introduce its flux conducting sector 6B and the non flux conducting sector 6A between the magnets in each pair. During the time when the non-flux conducting material separates the magnets they are under mutual repulsion which is transmitted, through the stationary magnet 2 as the propelling force on the vehicle frame 5. Repulsion on the reciprocating magnet assembly 1,3 accelerates it up the inclined plane 4. The main interaction 2 between the reciprocating mass and the inclined plane is rolling friction force, opposite to the direction of travel, but much smaller in value then the force acting on the stationary magnet and, during the repulsion period, each magnet pair develops a net propulsive force on the vehicle frame in the direction of travel.

When the flux conducting sector enters the space between magnets in each pair the repulsive magnetic field is cancelled and each magnet becomes attracted to the disc. Opposite and equal attractive forces arise between the disc and the stationary magnet. The attraction between the disc and the reciprocating magnet accelerates the free magnet assembly down the inclined plane and generates, through disc mounting, a force on the frame in opposite to travel direction. But as the reciprocating mass moves down the slope under the mentioned attraction and gravity forces, due to its potential energy in the extreme up position it gains momentum which will be transmitted as an impulse to the vehicle frame in the direction of travel by the attached to it elastic link 12. This impulse will be greater than the impulse of the negative force through the disc mounting.

The sectors of the rotating disc are of required proportions to assure that the movement of the free magnet assembly is in a direction corresponding to presence of a particular sector material taking into consideration the time for the free magnet assembly to move a set distance under repulsion, the time to return to its original position under attraction and gravity forces, the free magnet assembly mass and the speed of rotation of the disc.

A number of magnet pairs is provided on the periphery of the rotating disc and during any time one or more of the magnet pairs are under repulsion generating a steady propelling force on the vehicle. A number of inclined planes 4 accomodate the movement of free magnet assemblies. Considering the arrangement utilising attraction between opposite poles of two permanent magnets, FIG. 4, when the non-flux conducting sector is between the magnets in each pair they are under mutual attraction which is transmitted, through the stationary magnet 2, as the propelling force on the vehicle frame. Attraction force on magnet 1 accelerates the free magnet assembly up the inclined plane and, as above, during this time the only interaction between the reciprocating assembly and the frame is rolling friction force. As the disc 13 rotates and the magnetized sector enters between the two magnets the attractive magnetic field is cancelled. Attraction arises between the stationary magnet and the disc leading to cancelling opposite forces. The free magnet assembly is repelled by the similarly poled magnetized sector of the disc. The disc transmits, through its mounting, a force on the vehicle frame opposite to the direction of travel which will be compensated by the momentum transmitted to the frame when the free magnet assembly reaches the end of its stroke at frame mounted stop 14.

An arrangement utilising repulsion between a reciprocating permanent magnet and a stationary electromagnet, FIG. 5, eliminates the rotating two sector disc. A voltage transforming and timing device 7 supplied from a storage battery 10, energizes the coil of an electromagnet II to the same polarity as the facing pole of the reciprocating magnet. During this period a propelling force is transmitted to the vehicle frame through the electromagnet mounting and, as above, the reciprocating magnet assembly is accelerated up the inclined plane. When the energising current is switched off the permanent magnet I will be attracted to the mild steel poles of the electromagnet and will be assisted in its movement by gravity forces. Again a negative force is transmitted to the frame due to the attraction acting acting on the electromagnet poles which will be compensated by the impulse on the frame when the free magnet assembly reaches the end of its return stroke. It will be mentioned here that in the first two arrangements described above, utilizing repulsion and attraction between two permanent magnets, a disc made of current conductive material is rotated in a magnetic field. This resembles an electricity generator and means can be probably found to draw off this energy and partially recharge the driving storage battery, a subject which can be the matter of further applications by others. It will be mentioned here that in the first two arrangements described above, utilising repulsion or attraction between two permanent magnets, a disc made of current conducting material is rotated in a magnetic field. The currents generated provide a great part of the resistance to rotation. Means can be probably found to draw off this energy, generated ayway, and partialy recharge the driving storage battery, a subject which can be the matter of further applications by others.

What is claimed and desired to be secured by Letters Patent is:

1. A vehicle propulsion system comprising:
a substantially horizontal base member,
a plurality of wheels supporting said base member above the ground,
an inclined surface mounted on said base member,
said inclined surface having a negative slope in the direction of travel of the propulsion system,
a stationary permanent magnet mounted on the horizontal base member,
a reciprocating assembly operatively mounted on the inclined surface
said reciprocating assembly containing at least one permanent magnet facing said stationary magnet,
means for alternately establishing and cancelling the magnetic field between the two magnets, whereby the establishment of the magnetic field causes the reciprocating assembly to move up the inclined surface and, upon cancellation of the field, to return to its original position under the influence of gravity to thereby impart a continuous reciprocation of the reciprocating assembly,
said reciprocating assembly generating forces which are transmitted to the wheels to thereby propel the system in a predetermined direction of travel.

2. The vehicle propulsion system of claim 1 wherein said means to establish and to cancel the magnetic field between the two permanent magnets comprise a rotating disc consisting of a flux conducting sector and a non-flux conducting sector.

3. The vehicle propulsion system of claim 1 wherein said means to establish and to cancel the magnetic field comprise an electromagnet as the stationary magnet with timing energizing and deenergizing device.

4. The vehicle propulsion system of claim 1 wherein said reciprocating assembly comprises a mass which is supported on the inclined surface by a plurality of wheels and thereby rolls up and down the inclined surface.

* * * * *